July 6, 1965

C. WANTZ 3,192,782

FLEXIBLE SEAL

Filed Nov. 2, 1961

INVENTOR.
CLARENCE WANTZ

BY Robert R Candor

ATTORNEY 3,192,782
FLEXIBLE SEAL
Clarence Wantz, Greensburg, Pa., assignor to Robertshaw Controls Company, Richmond, Va., a corporation of Delaware
Filed Nov. 2, 1961, Ser. No. 149,596
7 Claims. (Cl. 74—18.2)

This invention relates to a seal construction and particularly to a seal construction between a shaft and a wall and the like through which the shaft passes.

According to this invention, a shaft passes transversely through an opening in a wall and the like, the wall having a wall sealable surface surrounding the opening. The shaft has means providing a shaft sealable surface generally transverse to the shaft. A rubber-like, or elastic, hermetic tubular sleeve snugly or slidingly surrounds the shaft between the surfaces and has elastic flanges at its ends, with non-sliding sealing engagements with the wall sealable surface and with the shaft sealable surface. A spring means outside of the sleeve may be provided for pressing the flanges against the respective sealable surfaces.

By this construction the non-sliding sealable engagements between the flanges and the wall and shaft constructions provide a superior hermetic seal at these points, since the surfaces are non-sliding and self sealing, and remain tight at all times. The tubular sleeve which surrounds the shaft may have a snug or sliding fit or other type of relationship, such that the shaft supports or holds the sleeve against lateral collapse.

In view of this, a very simple and effective seal is provided which remains surprisingly fluid proof because of the non-sliding engagements at the flanges or non-sliding surfaces.

This invention may also include a pilot valve construction in which a pilot valve stem passes through a wall and is actuated by a fluid actuated motor which may be a vacuum actuator connected to a vacuum program control system.

Accordingly, it is an object of this invention to provide a seal construction having one or more of the features herein disclosed.

Another object of this invention is to provide a valve construction having one or more of the features herein disclosed.

Other objects are apparent from this description and from the accompanying drawings, in which.

Figures 1, 2:
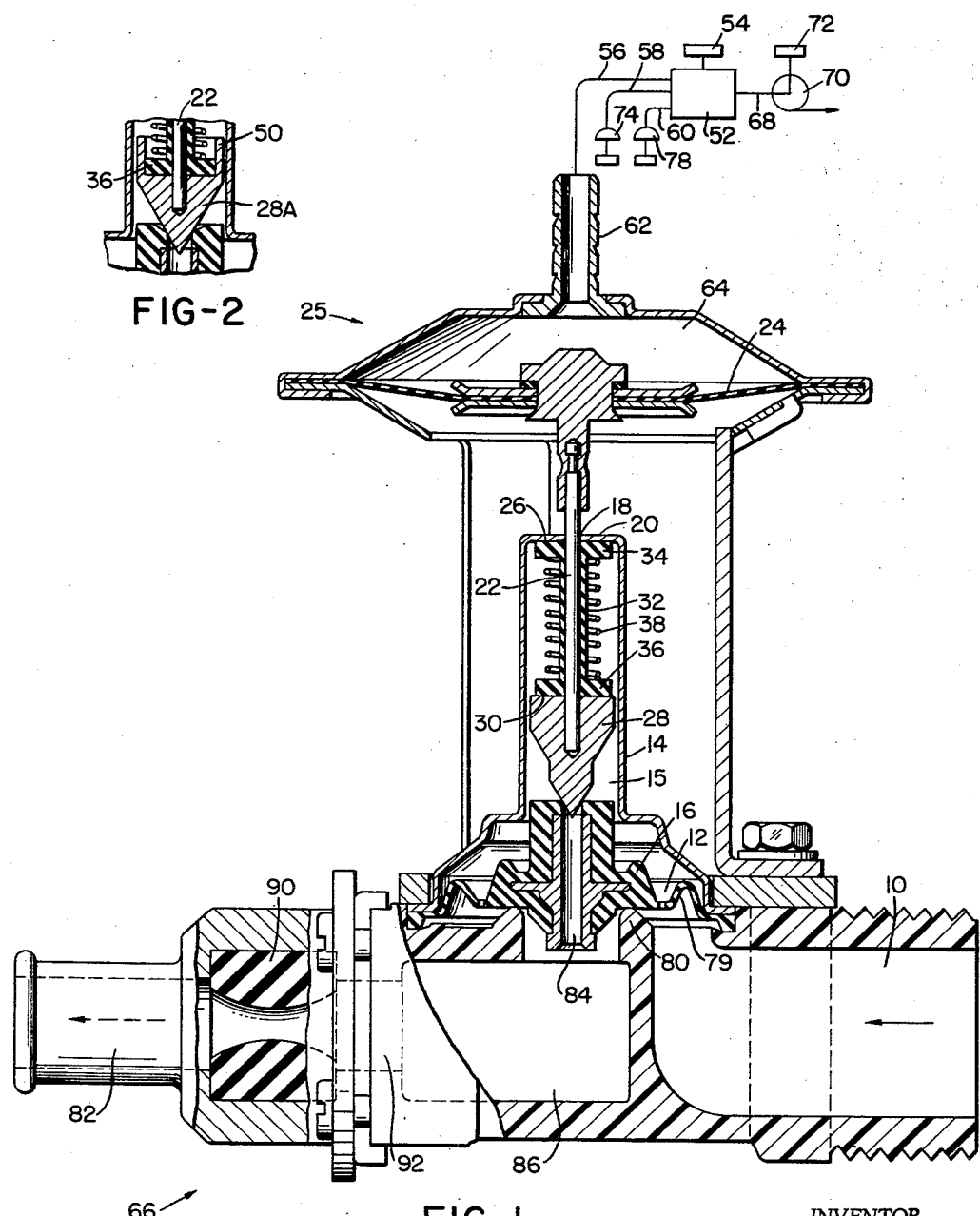
FIGURE 1 is a view partly in elevation and partly in cross section, and showing the seal and valve.
FIGURE 2 is a view similar to a portion of FIGURE 1, but showing another embodiment of the shaft sealable surface which may be used.

Certain words are used, such as those describing direction, relative position, and the like, in this application for the sake of brevity and clearness of description, such as "above," "below," "vertical," "horizontal," etc. However, it is to be understood that such words are used in connection with the specific disclosures in the drawings, and that the actual devices may have entirely different directions and relative positions, etc., as is obvious.

In FIGURE 1, a fluid, such as water under pressure, enters through the inlet 10, passes through the small openings 12 in the diaphragm valve structure 16, and enters the interior chamber 15 of sleeve 14, where varying fluid pressures are produced, depending upon the original pressure of the liquid at the inlet 10, the position of the valves 16, and the like.

The fluid or liquid in the interior chamber 15 of sleeve 14 is prevented from passing out through an opening 18 in the transverse fluid separating end wall 20 at the point where the shaft 22 passes transversely through the opening 18. The shaft 22 is moved longitudinally transversely of the wall 20, and through the opening 18, as by the diaphragm structure 24 of the fluid actuated motor, or vacuum actuator 25. Any means for moving the shaft 22 may be used.

In the structure disclosed, the sleeve 14 in wall 20 may have water or other fluid on one or lower side of the wall 20, and air or any other fluid on the other or upper side of the wall 20. The substances on opposite sides of the wall 20 may be any desired substances to be prevented from passing through the seal structure at the wall 20.

The wall 20 may have a wall sealable surface at 26 which surrounds the opening 18. The shaft 22 may have means or other formation 28 forming a generally transverse shaft sealable surface 30. In this particular instance, the means 28 may be in the form of a pilot valve 28, which is axially secured to the shaft 22, so that shaft 22 and the means or pilot valve 28 moves up and down as a unit. In this manner, there is a wall sealable surface 26 and a shaft sealable surface at 30 which are generally transverse to the shaft 22.

A rubber-like, or other elastic, material may form a hermetic tubular sleeve 32 which may surround the shaft 22 in a manner so the shaft 22 prevents sidewise collapse of the tubular sleeve 32. For example, the sleeve 32 may snugly and/or slidingly surround the shaft 22 between the surfaces 26 and 30.

The sleeve 32 may have elastic flanges 34 and 36 at the ends of the sleeve 32, which have non-sliding sealing engagement respectively with the wall sealable surface 26 and the shaft sealable surface 30. These non-sliding sealing engagements between the flexible flanges and the surfaces 26 and 30 provide a very simple and effective fluid tight seal which remains surprisingly and absolutely fluid proof for very long periods of time. The fluid tight nature of these seals and their extremely long life is produced by the non-sliding sealing engagement between the yielding or elastic surfaces of the rubber-like flanges 34 and 36 and the relatively solid surfaces 26 and 30. There is substantially nothing to wear out by friction in this seal.

Spring means 38 outside of the sleeve 32 may press against the flanges 34 and 36 to press them against the respective sealable surface 26 and 30 and thus insure the tightness of the engagement at these surfaces 26 and 30. The spring 38 may be a helical compression spring, with its ends pressing against the flanges 34 and 36.

If there is a sliding engagement between the tubular sleeve 32 and the shaft 22, because of the compression and elongation of the sleeve 32 as the shaft 22 is moved up and down, this sliding engagement need not be a hermetic seal, since the hermetic seal required for the construction is completely produced at the surfaces 26 and 30 where there is no sliding engagement.

Any type of wall construction may be used at 20 and any type of wall construction surface may be used at 26 to provide a sealable surface. Any type of shaft construction may pass through the opening 18 and the shaft may have any type of formation 28 which provides a transverse shaft construction surface 30 which is generally transverse to the shaft construction.

The sleeve 32 may surround the shaft 22 in any manner so that it cannot collapse sidewise and may be prevented from doing so by the shaft 22. It may snugly surround the shaft and/or it may slidingly surround the shaft, as desired, and the construction being such that the actual sealing action is produced at the non-sliding and hermetic seal constructions between the surfaces 26 and 30 and the surfaces of the flanges 34 and 36.

The elastic surface of the flanges 34 and 36 is such that no fluid can flow between the tightly held surfaces which are held tight by the spring or the like construction 38. The spring 38 may be a compression helical spring or the like.

In the embodiment of FIGURE 2, the shaft 22 may be the same as shaft 22 of FIGURE 1, and all of the other cooperating fitting parts may be substantially the same as in FIGURE 1. The shaft formation and the like 28A may be substantially the same as 28 of FIGURE 1. However, an upward flange 50 may be provided extending upwardly to surround the outer edge of the flange 36, to retain the flange 36 in place and to prevent damage thereto. If desired, a similar and downward flange may be provided on the wall 20 at the upper end of the seal to surround the flange 34.

This seal construction may be used anywhere. Such use may include structures which are substantially different from those disclosed herein.

The structure herein disclosed may be pilot valve structure which may supply water from a domestic water supply source to a clothes washing machine, in which the valve structure may be operated by a fluid motor or a vacuum program system. For example, a timer 52 may be driven by a timer motor 54. The timer 52 may have a suitable internal structure to connect one or more of a plurality of vacuum lines 56, 58, and 60, which may be sequentially activated by the timer 52 to produce vacuums therein in any desired program sequence. The line 56 may be connected to the pipe nipple 62 of the vacuum actuator 25. The nipple 62 may be connected to the vacuum chamber 64 above the diaphragm 24. The construction is such that a vacuum may be produced in the chamber 64 as long as it is desired to cause water to pass through the water valve construction 66. When it is desired to stop the flow of water, the vacuum is broken in the vacuum chamber 64 by any desired construction in the timer 52 and this causes the valve 66 to be closed as elsewhere described.

A line or vacuum manifold 68 may be maintained in a vacuum condition by the vacuum pump 70 which may be driven by a motor 72 if desired. The timer 52 may connect any and/or all of the lines 56, 58, and 60, etc. with the line 68 by any suitable valve means or other connecting means in the timer whenever it is desired to produce a vacuum in the vacuum chambers of the vacuum actuators such as the vacuum actuator 25 and/or the other vacuum actuators 74 and 78, and the like. These actuators may control various parts of a domestic laundry washing machine and the like to produce the desired operations and sequences in the washing machine, such as agitation, centrifugal extraction, filling operations, etc.

The valve construction 66 may have a flexible diaphragm valve 16 which seats on the inlet side of the valve seat 80 when it is desired to prevent the flow of wtaer from the inlet 10 to the outlet 82. The sleeve 14 has its lower end periphery engaging and sealed to the periphery of the valve 16 by any suitable construction. When it is desired to cause water to flow from the inlet 10 to the outlet 82, the pilot valve 28 is lifted by the production of a vacuum in the chamber 64 under the control of timer 52. This permits water to flow from the chamber 15, through the pilot passageway 84, and into the discharge outlet passage 86 at a faster rate than the liquid can flow through the small opening or openings 12 in the diaphragm 79 from the inlet 10 to the chamber 15, because the passageway 84 is much larger in volume capacity than the small opening or openings 12. This causes a greater upward pressure to be placed on the lower side of the outer diaphragm portion 79 in the area surrounding the valve seat 80 than is produced downwardly on the top of diaphragm so a greater force is produced on the under side of the valve 16 to lift it up and allow liquid to flow directly from the inlet 10 past the valve seat 80 to the passageway 86 and from thence through a constant volume controller 90, if desired, and from thence to the water outlet 82 and into the washing machine tub.

When it is desired to stop the flow of water, the vacuum is broken in the chamber 64 and the spring 38 pushes the pilot valve 28 against the upper end of passage 84. This allows the water pressure in chamber 15 to build up through opening 12 to the point where the combined water pressure and spring pressure on the upper part of the valve 16 is greater than on the lower side of the valve 16. This causes the valve 16 to be driven down to close the valve seat 80.

If desired, two valve structures similar to that of 28, 84, etc. may be placed side by side, or end to end, and they may discharge into a common outlet 92, which in turn, discharges into a common measuring construction 90 and common outlet 82. The second valve is not shown in these drawings, as it may be identical and directly behind the valve illustrated herein. One of these valves may be connected to a hot water supply, such as an automatic domestic hot water heater, with a thermostat control, to provide water of the desired amount and temperature. The other valve, not shown, may be connected to a cold water supply. These two valves may be energized simultaneously when it is desired to have tepid water in the washing machine. The hot water valve alone may be opened when it is desired to have hot water alone. The cold water valve may be opened alone when it is desired to have cold water, as is obvious.

It is thus to be seen that a seal construction has been provided in which non-sliding surfaces are maintained together to produce a fluid proof hermetic seal, and yet a longitudinal movement is permitted between the sealed parts, such as wall 20 and shaft 22, which movement does not in any way affect the non-sliding contact surfaces at 26 and 30 which remain fluid tight against each other without any sliding relationship and notwithstanding that there may be a sliding action between the sleeve 32 and the shaft 22.

It is also to be seen that a uniform and integral elastic and/or rubber-like construction may be produced which is very effective as a seal, and which has no frictional parts to wear out.

An improved pilot valve construction is also provided which may be operated by a fluid pressure differential system, such as a vacuum operated program system.

While the form of the invention now preferred has been disclosed as required by statute, other forms may be used, all coming within the scope of the claims which follow.

What is claimed is:

1. In combination: a separating wall to separate substances on opposite sides of said wall, said wall having a shaft receiving opening therein surrounded by a sealable surface; a shaft passing through said opening generally transversely to said sealable surface, said shaft having means providing a sealable surface generally transverse to said shaft; an elastic hermetic tubular sleeve snugly and slidingly surrounding said shaft between said surfaces and having elastic flanges at its ends having non-sliding sealing engagements respectively with said respective sealable surfaces; and spring means outside said sleeve and pressing said flanges against said respective sealable surfaces.

2. In combination: a separating wall to separate substances on opposite sides of said wall, said wall having a shaft receiving opening therein surrounded by a sealable surface; a shaft passing through said opening generally transversely to said sealable surface, said shaft having means providing a sealable surface generally transverse to said shaft; an elastic hermetic tubular sleeve surrounding said shaft between said surfaces and held against lateral collapse by said shaft, said sleeve having opposed ends disposed in sealing engagement with said surfaces; and means forcing said ends into sealing engagement with said surfaces.

3. In combination: a separating wall to separate substances on opposite sides of said wall, said wall having a shaft receiving opening therein surrounded by a sealable surface; a shaft passing through said opening generally transversely to said sealable surface, said shaft having means providing a sealable surface generally transverse to said shaft; an elastic hermetic tubular sleeve snugly and slidingly surrounding said shaft between said surfaces and having elastic flanges at its ends having non-sliding sealing engagements respectively with said respective sealable surfaces; and spring means outside said sleeve and pressing said flanges against said respective sealable surfaces and in which an annular retaining flange surrounds one of said elastic flanges.

4. In combination: a separating wall to separate substances on opposite sides of said wall, said wall having a shaft receiving opening therein surrounded by a sealable surface; a shaft passing through said opening generally transversely to said sealable surface, said shaft having a formation providing a sealable surface generally transverse to said shaft; an elastic hermetic sleeve snugly and slidingly surrounding said shaft construction between said sealable surfaces and having elastic flanges at its ends having generally transverse non-sliding sealing engagements respectively with said sealable surfaces; and means forcing said flanges into sealing engagement with said surfaces.

5. In combination: a separating wall to separate substances on opposite sides of said wall, said wall having a shaft receiving opening therein surrounded by a sealable surface; a shaft passing through said opening generally transversely to said sealable surface, said shaft having a shaft formation providing a sealable surface generally transverse to said shaft; an elastic hermetic sleeve closely surrounding said shaft between said surfaces and having flanges at its ends having non-sliding sealing engagements respectively with said respective sealable surfaces; and a spring outside said sleeve and pressing said flanges against said respective sealable surfaces.

6. In combination: a separating wall to separate substances on opposite sides of said wall, said wall having a shaft receiving opening therein surrounded by a sealable surface; a shaft passing through said opening generally transversely to said sealable surface, said shaft having a shaft formation providing a sealable surface generally transverse to said shaft; an elastic hermetic sleeve closely surrounding said shaft between said surfaces and having flanges at its ends having non-sliding sealing engagements respectively with said respective sealable surfaces; and means forcing said flanges into sealing engagement with said surfaces.

7. In combination: a separating wall to separate substances on opposite sides of said wall, said wall having a shaft receiving opening therein surrounded by a sealable surface; a shaft passing through said opening generally transversely to said sealable surface, said shaft having a shaft formation providing a sealable surface generally transverse to said shaft; an elastic hermetic sleeve closely surrounding said shaft between said surfaces and having sealing surfaces at its opposite ends which have non-sliding sealing engagements respectively with said respective sealable surfaces; and means forcing said sealing surfaces of said sleeve into sealing engagement with said sealable surfaces of said wall and of said shaft respectively.

References Cited by the Examiner
UNITED STATES PATENTS

| | | | |
|---|---|---|---|
| 2,111,230 | 3/38 | Toussaint | 251—38 X |
| 2,430,064 | 11/47 | Lawson | 74—18.2 |
| 2,888,037 | 5/59 | Jones et al. | 251—335.2 X |
| 2,895,708 | 7/59 | Palumbo | 251—335 X |
| 3,048,412 | 8/62 | Baker | 277—75 |

BROUGHTON G. DURHAM, *Primary Examiner.*

WILLIAM F. O'DEA, *Examiner.*